July 30, 1946.  I. FEUER ET AL  2,405,026
ALPHA-RAY EMISSION DEVICE AND METHOD OF MAKING THE SAME
Filed Dec. 14, 1943
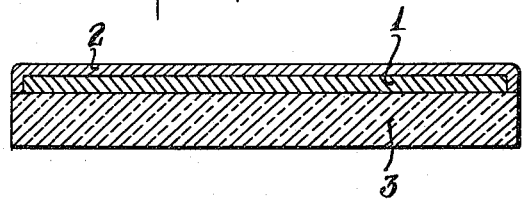
INVENTORS
Irving Feuer and
Ladislas Goldstein
BY
Mock + Blum
ATTORNEYS Patented July 30, 1946

2,405,026

UNITED STATES PATENT OFFICE 2,405,026

ALPHA-RAY EMISSION DEVICE AND METHOD OF MAKING THE SAME

Irving Feuer and Ladislas Goldstein, New York, N. Y., assignors to Canadian Radium & Uranium Corporation, New York, N. Y., a corporation of New York Application December 14, 1943, Serial No. 514,232

8 Claims. (Cl. 250—106)

Our invention relates to an alpha-ray emission device and a method of making the same.

One of the objects of our invention is to provide an alpha-ray emission device, which will produce an alpha-ray emission of constant or uniform intensity.

Another object is to provide a device which will retain the radon or other gas which is produced by the disintegration of the radio-active material.

Another object is to provide such a device which can be easily handled, and in which escape or loss of the radio-active material is prevented.

Another object is to provide such a device which is unaffected by external atmospheric humidity or other external factors which may affect the uniformity of alpha-ray emission.

Numerous additional objects of my invention will be stated in the annexed description and drawing, which illustrate preferred embodiments thereof.

Fig. 1 is a diagrammatic sectional view of one embodiment.

Fig. 2 is a similar view of another embodiment.

To prepare the embodiment of Fig. 1, a suitable radio-active material is dissolved in a suitable solvent. For example, a salt of radium, such as radium chloride, is dissolved in methanol or ethanol. The invention is not limited to any specific radio-active material or to any specific solvent, as long as the radio-active material emits alpha-rays.

A suitable plastic carrier-material is also dissolved in said solvent. For example, said carrier-material may be film-forming materials such as cellulose nitrate, cellulose acetate, collodion, etc. The carrier-material may be independently dissolved in a suitable solvent, and said solution may be intermixed with the solution of the radio-active material, if said solutions are compatible, so that the solutes will not be precipitated. The invention is not limited to any specific carrier-material, as we can use natural and synthetic resins, etc., even if such carriers do not provide self-supporting films.

The carrier materials which we use are non-metallic, and they permit the escape of the radon which is reduced by the disintegration of the radium.

The solution of the radio-active material and of the carrier-material is spread upon a very clean and very smooth surface, such as the smooth planar surface of a supporting sheet of glass 3. The solution may be warmed so as to provide a uniform surface film 1 of said solution on the glass surface or the like.

The support 3 and its said film 1 are then heated to evaporate the solvent and to remove water. If either methanol or ethanol is the solvent, the support 3 and its said film 1 can be dried in an enclosed oven at a temperature of 50° C. to 60° C. The oven can contain a suitable desiccating agent, such as phosphorus pentoxide, calcium chloride, etc., in order to remove all traces of water. The heating in said oven can be in air at atmospheric pressure, or in a vacuum.

The support 3 and its dried film 1 are then removed from the furnace. The film 1 is preferably continuous and of uniform thickness. There is enough carrier-material to provide a coherent film 1, which can be stripped from its support 3. Hence the film 1 is self-supporting.

The film 1 is removed from its support 3 in any suitable manner. This can be done, for example, by introducing water between the film 1 and its support 3, while peeling the film 1 from its support 3.

The film 1 is then located in a jar, which is maintained under a suitable vacuum. Said film 1 is then provided at each face thereof, with a covering layer 2, which is made of gold, silver, aluminum or other suitable material. The entire film 1 can be enclosed in said covering material. The maximum thickness of the film 1 may be .01 mm., if the carrier material is cellulose nitrate or cellulose acetate. Said carrier-material may include any suitable plasticizing material, in order to make the film strong and flexible.

The thickness of the covering material 2 of gold, silver, etc., may be about one micron, although a greater thickness can be used.

The covering material 2 can be deposited by heating a mass of gold or silver or aluminum or other metal by means of an electrically-heated tungsten wire which is located in the evacuated jar, in order to vaporize the gold or silver or other metal at a relatively low temperature in the high vacuum. The metallic vapor is thus deposited on one or both faces of the film 1, without injuring the film 1. This type of deposition is designated as "sputtering." We can use any type of sputtering method, while controlling the temperature so as to prevent injury to the carrier material. For example, cathodic sputtering is a well-known type of sputtering. The film 1 may be thus coated in other ways, as by the use of the Schoop method, whereby atomized molten metal is sprayed by a jet of inert gas, so that fine solid particles of the covering metal are deposited on the film.

If the metal vapor is deposited in a vacuum, as by sputtering, said vacuum is wholly or substantially free from water vapor. The vacuum is in the order of $10^{-6}$ mm. of mercury.

As an example, the percentage of radium per se in said film 1, may be one per cent to fifty per cent by weight.

The disintegration of the radium produces radon. The radon is prevented from escaping from the film 1, by means of the covering material 2. The intensity of the alpha-ray emission of a freshly-made and freshly covered film 1 will increase, until a condition of equilibrium is produced, in which the formation of fresh radon is compensated by the disintegration of previously formed radon, until a condition of equilibrium is secured, in which the intensity of alpha-ray radiation is constant. The half-period of radon is 3.8 days.

If radon is thus produced and retained by the covering 2, equilibrium is secured and retained at the end of a period of about twenty-one days.

The thin covering layer 2 is penetrated by the alpha-rays. Such thin covering layer 2 is inert to moisture and many chemicals, so that it prevents any loss of the radio-active material, including radon or other radio-active emanation.

Instead of stripping the finished film 1 from the rigid support 3, the film 1 may be allowed to remain on said support 3, and the exposed face of said film 1 may be covered with gold and silver or other suitable protective material. In such case, the alpha-ray emissions are transmitted for use, only at the face of the film 1 which is spaced from the support 3. Hence our invention includes a device in which only a part of the film or residue has a coating of material which is permeable to alpha rays.

The film 1 may be removed from the rigid support 3, provided with its protective coating, and said film 1 and its covering 2 can then be affixed to any suitable rigid support. As stated on page 4 of "Handbook of Plastics" (1943) by Simonds and Ellis, the designation "plastic" refers to synthetic organic materials whose chief components are resinous or cellulose derivative binders. As stated on page 407 of said text, a self-supporting film is disinguished from non-self-supporting films which are left in permanent contact with the surfaces on which said non-self-supporting films are formed.

The claims for the article of manufacture are not limited to any method of making the same. The covering material, which is penetrable by alpha-rays, need not be a metal. It may be an alloy, instead of a single metal. In the preferred method, the metallic covering is provided by condensing a metallic vapor on all or on part of the surface of the mixture of carrier-material and radio-active material.

We have described preferred embodiments of the article of manufacture and a preferred method of making the same, but it is clear that numerous changes and omissions and additions can be made without departing from its spirit. We can use any suitable lacquer material as the carrier-material.

It may be that some of the radon or other emanation may escape through the covering material. However, such escape, if any, is so slight that the condition of equilibrium is attained and maintained. The invention is not limited to the use of radium or its compounds, as the radio-active material. For example, we can use actinium, which disintegrates to produce actinium X, which yields actinon as a gaseous emanation, which produces a deposit which radiates alpha-rays.

When radon disintegrates, the disintegration products are non-gaseous radium A, radium B, and radium C. The protective coating shields the said disintegration products against water and water vapor, the external air, and chemicals which might remove said non-gaseous disintegration products. Hence, when we state that the protective covering prevents the escape of the emanation, which is a gas, we include the retention of the non-gaseous disintegration product or products of the emanation.

We claim:

1. An alpha-ray emission device, said device comprising a film, said film comprising film-forming material which is intermixed with radio-active material which emits alpha rays and which disintegrates to produce a gaseous emanation which also emits alpha-rays, said film-forming material being permeable to said gaseous emanation so that said emanation escapes freely from within the interior of said film, said film having a coating which is permeable to alpha rays and which is sufficiently impermeable to said gaseous emanation to produce a condition of equilibrium in which there is constant intensity of alpha ray emanation from said device.

2. An alpha-ray emission device according to claim 1, in which said coating is a deposited and condensed metallic vapor.

3. An alpha-ray emission device according to claim 1 in which said film is self-supporting and flexible, said film being wholly enclosed in said coating.

4. An alpha-ray emission device, said device comprising a self-supporting and flexible film which consists substantially of film-forming material which is selected from a class which consists of plastics and matural resins and which is intermixed with radio-active material which emits alpha rays and which disintegrates to produce a gaseous emanation which also emits alpha-rays, said film being sufficiently thin and said plastic film-forming material being permeable to said gaseous emanation so that said gaseous emanation can escape freely from said film, said film having a covering which is substantially impermeable to said gaseous emanation, said covering being permeable to alpha rays and being substantially inert to water and to solvents for said plastic film-forming material, said surface coating being sufficiently impermeable to said gaseous emanation to produce a condition of equilibrium in which there is constant intensity of alpha-ray radiation from said device.

5. A device according to claim 4, in which said coating is a deposited and condensed metallic vapor.

6. A method of making an alpha-ray emission device which consists in evaporating the solvent from a solution whose solutes include film-forming material which is selected from a class which consists of plastics and natural resins and radio-active material which emits alpha rays and which disintegrates to produce a gaseous emanation which emits alpha-rays, thus producing a film which is a mixture of said solutes, said film being made sufficiently thin and said film-forming material being permeable to said gaseous emanation so that said gaseous emanation escapes freely from said film, and enclosing said film in covering material which is permeable to alpha-rays and which is sufficiently impermeable to said gaseous emanation to produce a condition of equilibrium in which there is constant intensity of alpha-ray radiation from said enclosed film.

7. A method according to claim 6 in which said covering material is metallic and it is produced by condensing metallic vapor on said film.

8. An alpha-ray emission device which comprises a dry residue of a solution of film-forming material which is selected from a class which consists of plastic and natural resins and of radio-active material which emits alpha-rays and which disintegrates to produce a gaseous emanation which also emits alpha-rays, said residue being sufficiently thin and said film-forming material being permeable to said gaseous emanation, so that said gaseous emanation escapes freely from said film, said residue having a covering of condensed metallic vapor which is permeable to alpha rays and which is sufficiently impermeable to said gaseous emanation, to produce a condition of equilibrium in which there is constant intensity of alpha ray radiation from said covered residue.

IRVING FEUER.
LADISLAS GOLDSTEIN.